July 5, 1927.
H. M. BRIDGES
DRAINER
Filed Aug. 2, 1926
1,634,705
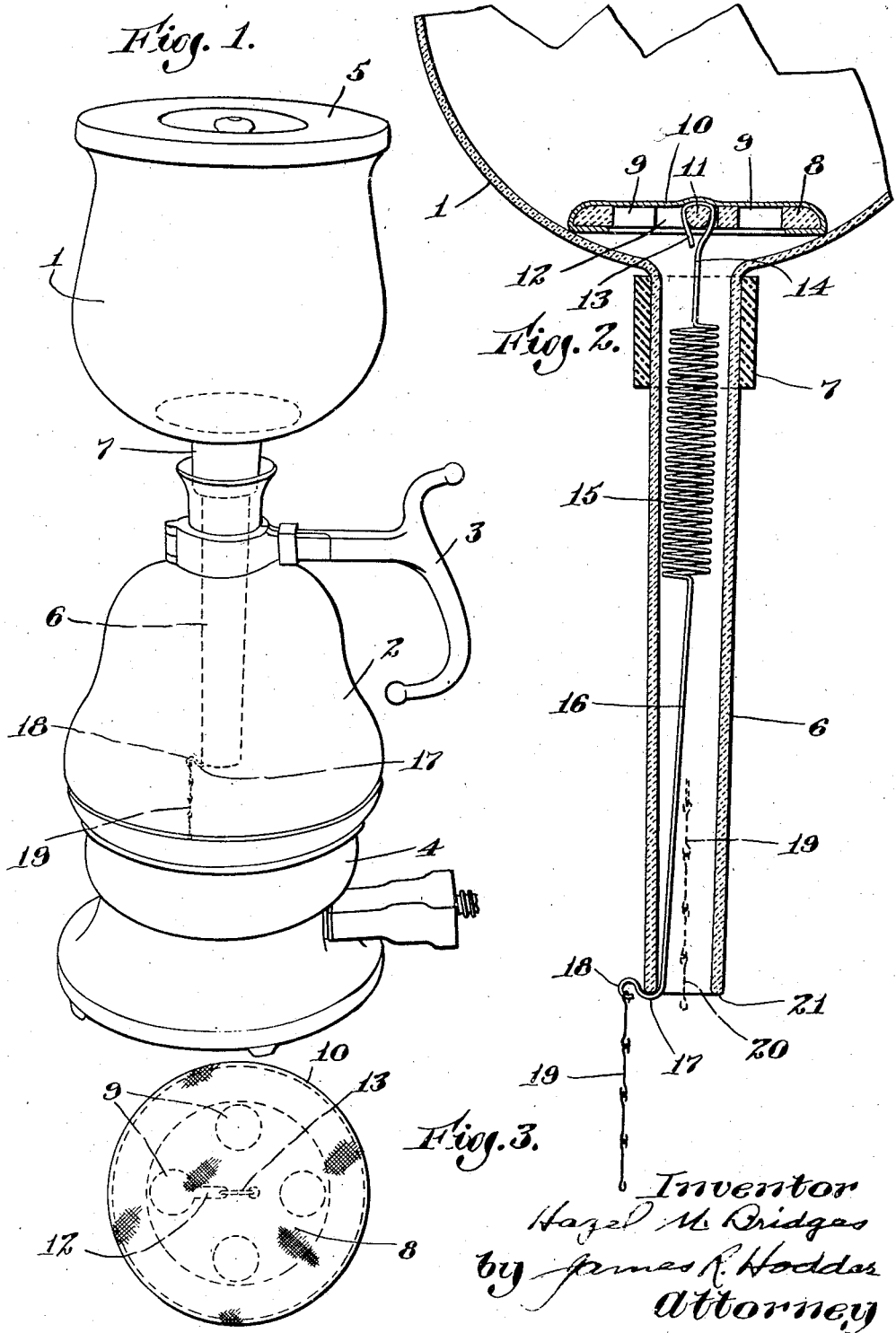

Patented July 5, 1927.

1,634,705

UNITED STATES PATENT OFFICE.

HAZEL M. BRIDGES, OF MALDEN, MASSACHUSETTS, ASSIGNOR TO SILEX COMPANY, OF MALDEN, MASSACHUSETTS, A CORPORATION OF CONNECTICUT.

DRAINER.

Application filed August 2, 1926. Serial No. 126,692.

My present invention is a novel and improved drainer for use in connection with the well known "Silex" type of coffee percolators.

A difficulty existent in prior percolators of this type has been in securing a sufficiently firm and tight seat of the drainer and strainer in the coffee receptacle, and still allow for expansion of the glass funnel, which is an integral part of the coffee receptacle. One prior method of securing the drainer in position in the coffee receptacle was to have a threaded stem depending from the drainer and protruding below the bottom of the funnel. To the lower end of this stem was threaded a wing nut, which was tightened to a degree sufficient to assure a firm seating of the drainer in the coffee receptacle. It frequently happened, however, that this nut was tightened so much that, upon application of heat and the consequent expansion of the glass in the funnel, there was no possibility of such expansion, with the result that the glass in the funnel fractured.

An important feature of my present invention, therefore, is the provision of spring tensioning means secured at one end to a porcelain drainer, which drainer has a cloth strainer therearound, and which spring tensioning means extend downwardly into the funnel. The tensioning means has a wire or rod on its lower end, provided with a hook, and the whole tensioning device is normally shorter than the length of the funnel. To the hooked end of the wire, however, is attached a short chain, or the like, extending a sufficient distance below the bottom of the funnel to enable it to be grasped, and allowing the hooked end of the wire or rod to be pulled below the bottom of the funnel, and hooked thereover. The spring is so constructed and arranged that when thus hooked it will exert a firm holding and seating grip on the drainer and strainer, but will still have sufficient spring left therein to allow for expansion of the glass funnel under heat. When it is desired to remove the drainer, the chain is pulled downwardly, releasing the hook, and permitting the drainer and spring tensioning device to be drawn upwardly through the funnel.

The spring, wire, and chain, are preferably made of non-corrosive and non-rusting metal in order that the liquid coming in contact therewith will not be contaminated.

I believe that my present invention of spring tensioning means to hold a drainer in a percolator of this type, and still allow for expansion of the glass under heat, is novel, and I therefore claim the same broadly herein.

Further features of the invention, novel combinations of parts, and advantages, will be hereinafter more fully pointed out and claimed.

Referring to the drawings illustrating a preferred embodiment of my invention,

Figure 1 is a perspective view of the well known "Silex" percolator;

Figure 2 is fragmentary detail of the coffee receptacle and funnel, in cross section, illustrating my novel drainer holding device in position; and Figure 3 is a top plan view of the drainer and strainer.

As shown in the drawings, I have illustrated the usual well known "Silex" percolator comprising a coffee receptacle 1, liquid receptacle 2, removable handle 3, and a base 4, preferably with an electric heating unit therein. A cover or lid 5 for the coffee receptacle is also provided. The coffee receptacle has a downwardly depending funnel 6, surrounded at the top by a rubber washer 7 to assure firm seating of the funnel in the neck of the liquid receptacle and preventing the passage of steam or liquid thereby. As clearly shown in Fig. 2, in the coffee receptacle is seated a drainer 8, preferably of porcelain, and having holes or apertures 9 therethrough, to permit the passage of liquid. A strainer 10, preferably of fine cloth or the like encloses the drainer, and extends slightly thereunder. To a rib 11, centrally of the drainer, and having a slot 12 leading thereto, is attached an end 13 of a wire 14. This wire is an integral part of a coiled spring 15, having a second wire 16 depending therefrom. The wire 16 terminates in a hook 17, having a loop 18 in which loop is inserted a short chain 19. The spring 15 and wire 16 in non-extended or normal position are shorter than the funnel, so that the chain 19 would be in the position illustrated in dotted lines in Fig. 2, with the lowest link 20 extending a sufficient distance below the bottom of the funnel to insure grasping thereof by the operator. Upon exerting a downward pull on the chain 19, the hook 17 of the wire 16 will also be pulled downwardly against the tension of the spring 15. When the hook 17 is caught over the lower edge 21 of the funnel, the drainer 8 and strainer 10 are held against the lower inner walls of the coffee receptacle with a firm, tight-fitting seat, thus preventing passage of coffee grounds therearound, to drop into the liquid receptacle. Although the drainer is thus held in a close, firm seat, there is still left in the spring sufficient "give" to allow expansion of the glass in the funnel 6 under heat.

It will thus be appreciated that I have devised a novel drainer and strainer holding device, one that is economical of manufacture, simple to operate, and efficient in action, and which has proved to be exceedingly useful in actual operation.

While I have described my present invention somewhat in detail, it will be appreciated that I am not limited thereto, but may vary the size, shape and arrangement of parts, within reasonably wide limits without departing from the spirit of the invention.

My invention is further defined and described in the form of claims as follows:

1. The combination with a glass coffee receptacle having a glass funnel depending therefrom of a perforated non-metallic drainer disc, a cloth strainer over said disc and a coiled spring attached to said drainer and depending through said funnel, said spring being normally shorter than the length of said funnel, and adapted, when extended, to be caught on the lower end of said funnel, and hold the drainer in position.

2. The combination with a glass coffee receptacle having a glass funnel depending therefrom of a perforated non-metallic drainer disc, a cloth strainer over said disc and a coiled spring attached to said drainer and depending through said funnel, said spring being normally shorter than the length of said funnel, and adapted, when extended, to be caught on the lower end of said funnel, and hold the drainer in position, and means depending from said spring to permit operation of said spring.

3. The combination with a glass coffee receptacle having a glass funnel depending therefrom of a perforated non-metallic drainer disc, a cloth strainer over said disc and a coiled spring attached to said drainer and depending through said funnel, said spring being normally shorter than the length of said funnel, a hooked wire depending from said spring, and adapted, on extension of said spring, to be caught over the lower end of said funnel, said spring being under sufficient tension to cause a firm seating of the drainer in the coffee receptacle, and yet allow for expansion of the glass funnel under heat, and means depending from said hooked wire to permit operation of said spring.

In testimony whereof, I have signed my name to this specification.

HAZEL M. BRIDGES.